United States Patent [19]

Yabe

[11] 4,190,482
[45] Feb. 26, 1980

[54] TIRE BUILDING APPARATUS

[75] Inventor: Toshinori Yabe, Kodaira, Japan

[73] Assignee: Bridgestone Tire Company Limited, Tokyo, Japan

[21] Appl. No.: 905,039

[22] Filed: May 9, 1978

[30] Foreign Application Priority Data

May 13, 1977 [JP] Japan .................................. 52/55875

[51] Int. Cl.² ............................................ B29H 17/22
[52] U.S. Cl. .................................. 156/403; 156/126; 156/131; 156/414
[58] Field of Search ............... 156/123, 126, 131, 132, 156/394, 401, 403, 405, 414–420

[56] References Cited

U.S. PATENT DOCUMENTS

| | | | |
|---|---|---|---|
| 3,078,204 | 2/1963 | Appleby | 156/132 |
| 3,121,653 | 2/1964 | Trevaskis | 156/131 |
| 3,224,921 | 12/1965 | Frazier | 156/131 |
| 4,007,080 | 2/1977 | Klopper | 156/126 |
| 4,039,366 | 8/1977 | Yabe | 156/126 |
| 4,105,487 | 8/1978 | Suzuki et al. | 156/126 |

Primary Examiner—John E. Kittle
Attorney, Agent, or Firm—Cushman, Darby & Cushman

[57] ABSTRACT

A tire building apparatus comprises in combination: a tire building drum including a cylindrical tire building drum body formed radially contactable and rotatable around a rotary axis thereof, and a pair of bead applying mechanism disposed in close proximity of both axial ends of the tire building drum body to be rotatable together with the tire building drum body and formed radially contactable; and a transfer ring including an annular frame movable toward and away from a position where the annular frame surrounds the tire building drum, a tire component carrying mechanism having a plurality of tire component carrying members radially movably mounted on the annular frame and capable of carrying a tire component in concentrical relation with the rotary axis of the tire building drum body to mount the tire component on and around the tire building drum, and a pair of bead carrying mechanisms mounted on the annular frame to be disposed at both axial ends of the tire component carrying mechanism in spaced relation with each other, each of the bead carrying mechanisms having a plurality of bead carrying members radially movable to carry beads in concentrical relation with the tire building drum body and movable toward and away from a position where the carrying mechanisms respectively surround the bead applying mechanisms and capable of setting beads on the tire component in cooperation with the bead applying mechanism while the annular frame surrounds the tire building drum.

4 Claims, 13 Drawing Figures

TIRE BUILDING APPARATUS

This invention relates to a tire building apparatus and in particular to an apparatus which comprises a transfer ring including a tire component carrying mechanism for carrying and transferring a cylindrical tire component made of inner liner, carcass ply, chafer and the like on and around a tire building drum provided with a pair of bead applying mechanism, and a pair of bead carrying mechanism for carrying and transferring beads on and around the cylindrical tire component.

There has thus far been proposed by U.S. Pat. No. 3,078,204 a tire building apparatus which comprises a tire building drum, a pair of bead carrying mechanisms disposed in the vicinity of axial ends of the tire building drum and each carrying a bead in concentrical relation with the rotary axis of the tire building drum, and a pair of driving mechanisms each independently moving the bead carrying mechanism toward and away from the tire building drum. According to the foregoing conventional tire building apparatus, it was required that a cylindrical tire component be wrapped on and around the tire building drum by an appropriate mechanism and thereafter be transferred to specific positions surrounding the cylindrical tire component by the respective bead carrying mechanisms. Therefore, such drawbacks have been encountered that a long period of time was required for stopping the tire bulding drum, thereby causing low operational efficiency as well as controlability for the bead carrying mechanisms was difficult. Moreover, in order to enable the bead carrying mechanism positioned around a rotary shaft of the tire building drum to carry the bead, it was required that the bead be transferred along and around the tire building drum, thereby causing the tire building drum to be stopped. This resulted in even more low operational efficiency for the tire building apparatus.

It is therefore a first object of the present invention to provide a tire building drum which can supply a cylindrical tire component and a pair of beads at one time on and around the tire building drum within a short period of time to stop the tire building drum, thereby enhancing the operational efficiency for the tire building apparatus.

It is a second object of the present invention to provide a tire building appatatus which is made easy for contrability by integrally forming and moving a cylindrical tire component carrying mechanism and a pair of bead carrying mechanisms toward and away from the tire building drum.

It is a third object of the present invention to provide a tire bulding drum which enables a pair of bead carrying mechanisms to carry a pair of beads at a position where the bead carrying mechanisms are situated away from the tire building drum so as to shorten a period of time required for stopping the tire building drum, thereby enhancing the operational efficiency for the tire building apparatus.

The previously mentioned objects are attained by a tire building apparatus embodying the present invention which comprises in combination: a tire building drum including a cylindrical tire building drum body formed radially contractable and rotatable around a rotary axis thereof, and a pair of bead applying mechanism disposed in close proximity of both axial ends of the tire building drum body to be rotatable together with the tire building drum body and formed radially contractable; and a transfer ring including an annular frame movable toward and away from a position where the annular frame surrounds the tire building drum, a tire component carrying mechanism having a plurality of tire component carrying members radially movably mounted on the annular frame and capable of carrying a tire component in concentrical relation with the rotary axis of the tire building drum body to mount the tire component on and around the tire building drum, and a pair of bead carrying mechanisms mounted on the annular frame to be disposed at both axial ends of tire component carrying mechanism in spaced relation with each other, each of the bead carrying mechanism having a plurality of bead carrying members radially movable to carry beads in concentrical relation with the tire building drum body and movable toward and away from a position where the carrying mechanisms respectively surround the bead applying mechanisms and capable of setting beads on the tire component in cooperation with the bead applying mechanism while the annular frame surrounds the tire building drum.

The above and other objects, features and advantages of the present invention will become clear from the following particular description of the invention and the appended claims, taken in conjunction with the accompaying drawings which show by way of example a preferred embodiment of the present invention.

Figure 1:
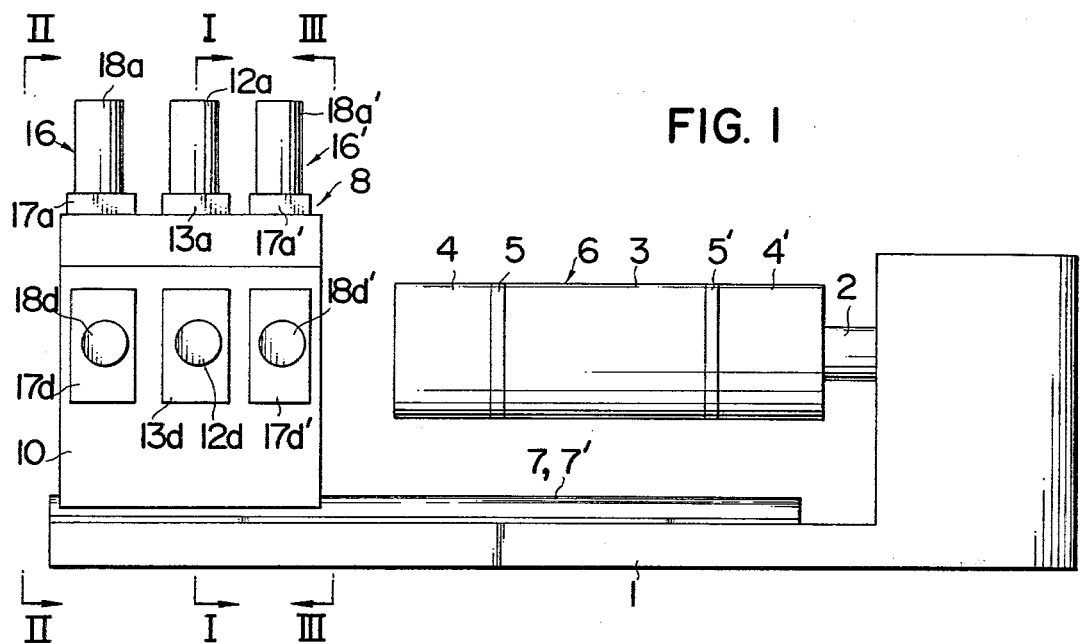
FIG. 1 is an elevational view of a tire building apparatus embodying the present invention.
Figure 2:
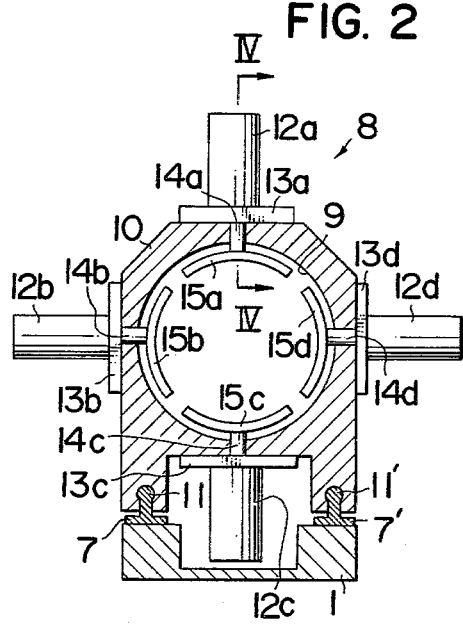
FIG. 2 is a cross-sectional view as seen from the lines I—I of FIG. 1.
Figure 3:
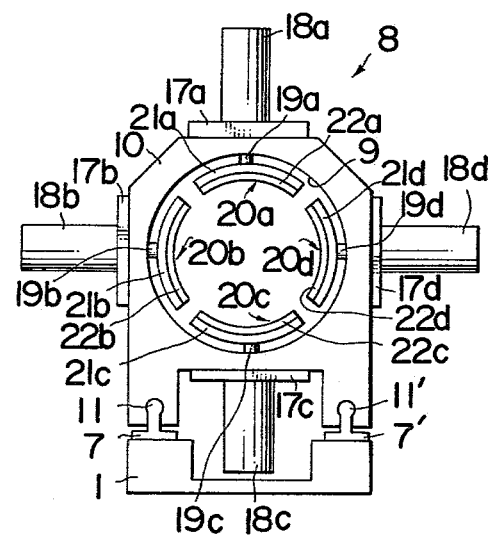
FIG. 3 is a cross-sectional view as seen from the lines II—II of FIG. 1.
Figure 4:
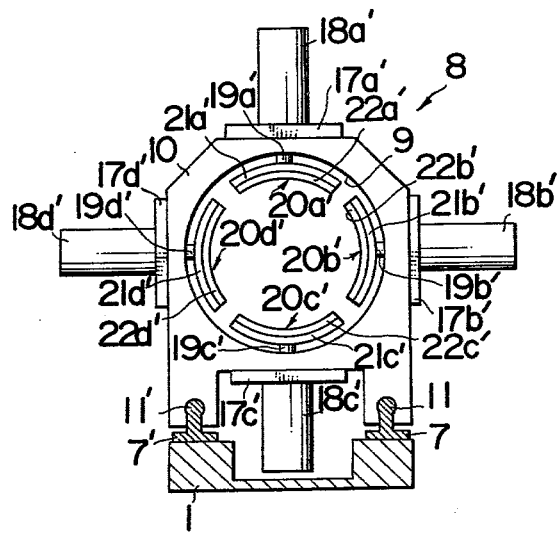
FIG. 4 is a cross-sectional view as seen from the lines III—III of FIG. 1.
Figure 5:
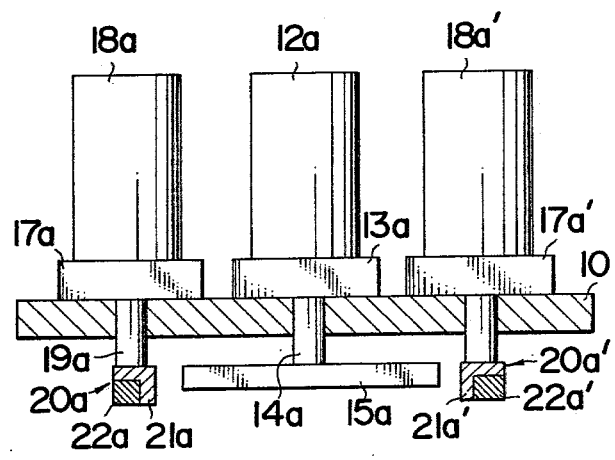
FIG. 5 is an enlarged cross-sectional view as seen from the lines IV—IV of FIG. 2.

Referring now to the drawings and in particular to FIGS. 1 to 5, there is shown a stationary frame structure 1 which houses therein a driving mechanism not shown. A rotary shaft 2 extending in the longitudinal direction of the stationary frame structure 1 is rotatably supported by the stationary frame structure 1 and drivably connected to the driving mechanism. On the longitudinally intermediate portion of the rotary shaft 2 is mounted a cylindrical tire building drum body 3 which is made radially contractable by a suitable contracting mechanism housed in the tire building drum body 3 but not shown. A pair of bead applying mechanisms 4 and 4' are disposed in close proximity of both axial ends of the tire building drum body 3 to be rotatable together with the tire building drum body 3. The bead applying mechanisms 4 and 4' respectively have fingers 5 and 5' which are radially contractable by a suitable contracting mechanism not shown. The tire building drum body 3 and the bead applying mechanisms 4, 4' constitute as a whole a tire building drum 6. A pair of parallel spaced rails 7 and 7' are securely mounted on the stationary frame structure 1 to extend in the longitudinal direction thereof. The reference numeral 8 generally indicates a transfer ring which comprises an annular frame 10 formed with an axial through bore 9 in which the tire building drum 6 is freely insertable. On the lower surface of the annular frame 10 is formed a pair of grooves 11 and 11' which are respectively in sliding engagement with the rails 7 and 7' so that the annular frame 10 is movable by means of a suitable transferring mechanism not shown toward and away from a position where the annular frame 10 surrounds the tire building drum 6. Four fluid operated cylinders 12a, 12b, 12c and 12d are securely mounted on the periphery of the annular frame 10 through brackets 13a, 13b, 13c and 13d in predetermined angular relation with each other to extend radially. The piston rods 14a, 14b, 14c and 14d of the fluid operated cylinders 12a, 12b, 12c and 12d are adapted to extend through the annular frame 10 and project to the axial through bore 9 and respectively have leading ends to which tire component carrying members 15a, 15b, 15c and 15d are attached to carry a cylindrical tire component with an appropriate way, such as for example vaccum. When the piston rods 14a, 14b, 14c and 14d are concurrently projected or retracted, the tire component carrying members 15a, 15b, 15c and 15d are simultaneously radially moved. The tire component carrying members 15a, 15b, 15c and 15d are formed arcuately to facilitate carrying the tire component in concentrical relation with the rotary shaft 2 of the tire building drum 6. The tire component carrying members 15a, 15b, 15c and 15d are moved together with the annular frame 10 while carrying the tire component to mount it on and around the tire building drum 6. The fluid operated cylinders 12a, 12b, 12c, 12d, the bracket 13a, 13b, 13c, 13d, the piston rods 14a, 14b, 14c, 14d, and the tire component carrying members 15a, 15b, 15c, 15d constitute as a whole a tire component carrying mechanism as defined in claims. A pair of fluid operated cylinder mechanism 16 and 16' are provided at the both axially outer sides of the fluid operated cylinders 12a, 12b, 12c and 12d in axially spaced relation with each other. The fluid operated cylinder mechanism 16 comprises four fluid operated cylinders 18a, 18b, 18c and 18d which are securely mounted on the periphery of the annular frame 10 through brackets 17a, 17b, 17c and 17d in predetermined angular relation with each other to radially extend. The fluid operated cylinder mechanism 16' also comprises four fluid operated cylinders 18a', 18b', 18c' and 18d' which are securely mounted on the periphery of the annular frame 10 through brackets 17a', 17b', 17c' and 17d' in predetermined angular relation which each other to radially extend. The piston rods 19a, 19b, 19c and 19d of the fluid operated cylinders 18a, 18b, 18c and 18d are adapted to extend through the annular frame 10 and project to the axial through bore 9 and respectively have leading ends to which bead carrying members 20a, 20b, 20c and 20d are attached to carry a metal bead. When the piston rods 19a, 19b, 19c and 19d are concurrently projected or retracted, the bead carrying members 20a, 20b, 20c and 20d are simultaneously radially moved. The bead carrying members 20a, 20b, 20c and 20d are arcuately formed and respectively includes bases 21a, 21b, 21c, 21d and magnets 22a, 22b, 22c, 22d secured to the axially outer ends of the bases 21a, 21b, 21c, 21d so that the magnets 22a, 22b, 22c and 22d can attract the metal bead to carry it in concentrical relation with the tire building drum 6. The bead carrying members 20a, 20b, 20c and 20d are moved together with the annular frame 10 while carrying the bead. When the annular frame 10 is moved to a position where the annular frame 10 surrounds the tire building drum 6, the bead comes to surround the cylindrical tire component around the finger 5. On the other hand, the piston rods 19a', 19b', 19c' and 19d' of the fluid operated cylinders 18a', 18b', 18c' and 18d' are adapted to extend through the annular frame 10 and project to the axial through bore 9 and respectively have leading ends to which bead carrying members 20a', 20b', 20c' and 20d' are attached to carrying another metal bead. The bead carrying members 20a', 20b', 20c', and 20d' are arranged in such a manner that the distance between the bead carried by the bead carrying members 20a, 20b, 20c, 20d and the bead carried by the bead carrying members 20a', 20b', 20c' and 20d' is equal to the distance between the fingers 5 and 5' of the bead applying members 4 and 4'. When the piston rods 19a', 19b', 19c' and 19d' are concurrently projected or retracted, the bead carrying mechanisms 20a', 20b', 20c' and 20d' are simultaneously radially moved. The bead carrying members 20a', 20b', 20c' and 20d' are arcuately formed and respectively includes bases 21a', 21b', 21c', 21d' and magnets 22a', 22b', 22c', 22d' secured to the axially outer ends of the bases 21a', 21b', 21c', 21d' so that the magnets 22a', 22b', 22c' and 22d' can attract the metal bead to carry it in concentrical relation with the tire building drum 6. The bead carrying members 20a', 20b', 20c' and 20d' are moved together with the annular frame 10 while carrying the bead. When the annular frame 10 is moved to a position where the annular frame 10 surrounds the tire building drum 6, the bead comes to surround the cylindrical tire component around the finger 5'.

The operation of the apparatus thus constructed will now be described hereinafter.

Figure 6A:
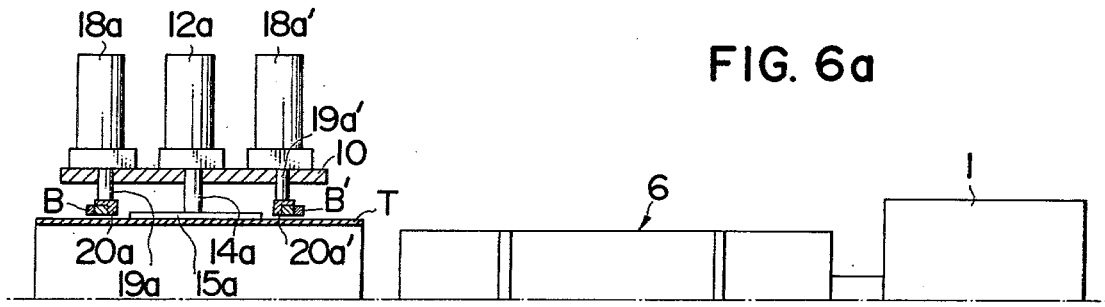
FIGS. 6a to 6h are fragmentary views, partly cross-sectioned, of the tire building apparatus embodying the present invention and showing operational stages of the tire building apparatus.

In the first stage as shown in FIG. 6a, the piston rods 14a, 14b, 14c and 14d of the fluid operated cylinders 12a, 12b, 12c and 12d project to their predetermined positions so as to permit the tire component carrying members 15a, 15b, 15c and 15d to carry a cylindrical tire component T in concentrical relation with the tire building drum 6. At this time, the piston rods 19a, 19b, 19c and 19d of the fluid operated cylinders 18a, 18b, 18c and 18d also project to their predetermined positions where the bead carrying members 20a, 20b, 20c and 20d carry a metal bead B in such a way that the magnets 22a, 22b, 22c and 22d attract the metal bead B in concentrical relation with the tire building drum 6 and surround the cylindrical tire component T. On the other hand, the piston rods 19a', 19b', 19c' and 19d' of the fluid operated cylinders 18a', 18b', 18c' and 18d' similarly project to their predetermined positions where the bead carrying members 20a', 20b', 20c' and 20d' carry another metal bead B' in such a way that the magnets 22a', 22b', 22c' and 22d' attract the metal bead B' in concentrical relation with the tire building drum 6 and surround the cylindrical tire component T.

Figure 6B:
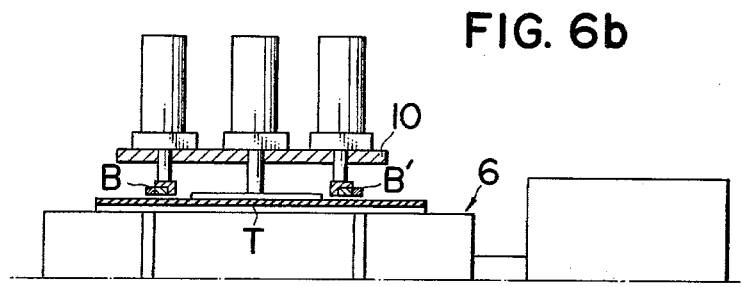

In the second stage as shown in FIG. 6b, the annular frame 10 is moved toward the tire building drum 6 while the tire component carrying members 15a, 15b, 15c and 15d remain carrying the cylindrical tire component T and the bead carrying members 20a, 20b, 20c, 20d and the bead carrying members 20a' 20b', 20c', 20d', remain carrying the beads B and B', respectively. When the annular frame 10 is moved to a position where the annular frame 10 surrounds the tire building drum 6 with the beads B and B' surrounding the cylindrical tire component T around the fingers 5 and 5', respectively, the annular frame 10 is stopped.

Figure 6C:
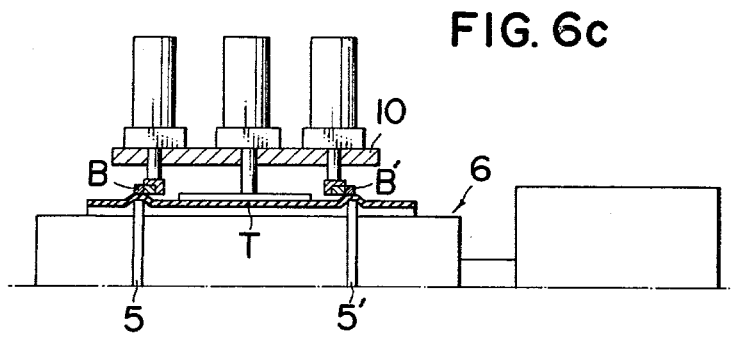

In the third stage as shown in FIG. 6c, the fingers 5 and 5' are radially expanded with the result that the beads B and B' are assembled with the cylindrical tire component T at their predetermined positions.

Figure 6D:
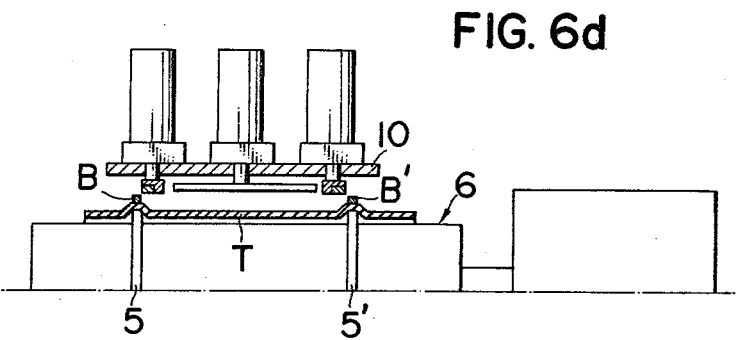

In the fourth stage as shown in FIG. 6d, the fluid operated cylinders 12a, 12b, 12c and 12d are actuated to retract the piston rods 14a, 14b, 14c and 14d whereby the tire component carrying members 15a, 15b, 15c and 15d are radially outwardly moved to release the tire component T. At this time, the fluid operated cylinders 18a, 18b, 18c, 18d, 18a', 18b', 18c' and 18d' are simultaneously actuated to retract the piston rods 19a, 19b, 19c, 19d, 19a', 19b', 19c' and 19d' whereby the bead carrying members 20a, 20b, 20c, 20d, 20a', 20b', 20c' and 20d' are radially outwardly moved to release the beads B and B'.

Figure 6E:
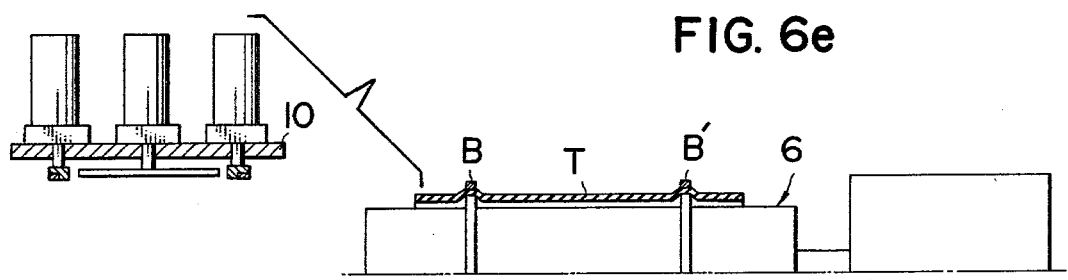

In the fifth stage as shown in FIG. 6e, the annular frame 10 is moved away from the tire building drum 6 to its initial position as shown in FIG. 6a together with the bead carrying mechanisms 16, 16' and the tire component carrying mechanism.

Figure 6F:
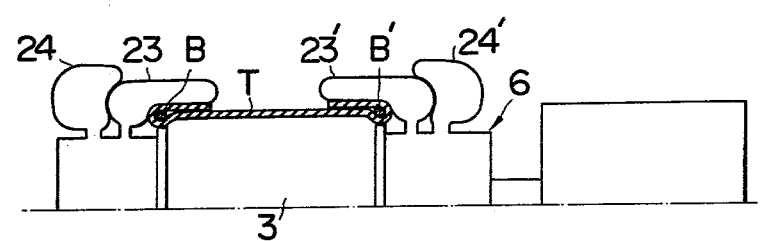

In the sixth stage as shown in FIG. 6f, the tire building drum body 3 is radially expanded and the cylindrical tire component T is turned up at its axially outer end portions by introducing compressed air into side bladders 23, 23', 25 and 25' which are provided in the bead applying mechanisms 4 and 4'. At this time, the beads B and B' are by no means displaced axially since the fingers 5 and 5' radially outwardly biased and securely fix the beads B and B'. The beads B and B' are thus assembled with the tire component T while being enveloped by the axially outer end portions of the tire component T.

Figure 6G:
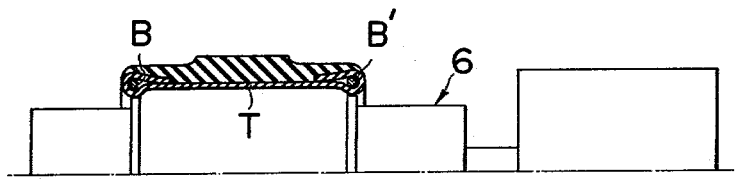

In the seventh stage as shown in FIG. 6g, other tire components such as carcass ply and tread are applied on the tire component T to produce a green case G while rotating the tire building drum 6 after discharging the compressed air from the side bladders 23, 23', 24 and 24'.

Figure 6H:
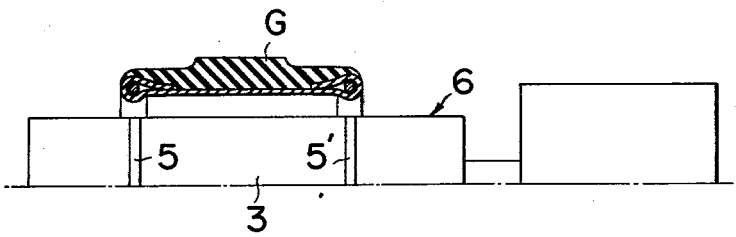

In the eighth stage as shown in FIG. 6h, the tire building drum body 3 is contracted simultaneously with contraction of the fingers 5 and 5', and thereafter the green case G is removed from the tire building drum 6 to be transferred to the next station.

According to the present invention, it is to be understood that a tire building drum is not required to be stopped for rotation as seen in the conventional tire building apparatus for preliminarily supplying beads on the bead carrying mechanisms. In addition, it is possible to supply the beads on the bead carrying mechanisms at any time after they are applied on the cylindrical tire component, such as for example, during stitching operation of the beads on the tire component, which makes it possible to effect a continuous tire building operation and thereby to attain enhancement of the operational efficiency of the tire building process. Moreover, the beads can be transferred together with the cylindrical tire component so that there is no need for complicated and expensive operation mechanisms and controlling mechanisms which were necessitated in the conventional apparatus and that the construction of the tire building drum of the present invention can be simplified as well as the quality of finished tires can be remarkably improved.

Although a particular embodiment of the present invention has been shown and described, it will be obvious to those skilled in the art that various changes and modifications may be made without departing from the spirit and scope of the present invention.

What is claimed is:

1. A tire building apparatus comprising in combination:
    a tire building drum, including:
    a cylindrical tire building drum body form so as to be radially expansible and contractable and so as to be rotatable around a rotary axis thereof and having two axial ends, and
    a pair of bead applying mechanisms disposed in close proximity of both axial ends of said tire building drum body to be rotatable together with said tire building drum body, and said mechanims being formed so as to be radially expansible and contractable; and a transfer ring, including:
    an annular frame movable toward and away from a position where said annular frame surrounds said tire building drum,
    a tire component carrying mechanism having a plurality of tire component carrying members radially movably mounted on said annular frame and being capable of carrying a tire component in concentrical relation with said rotary axis of said tire building drum body to mount said tire component on and around said tire building drum, and
    a pair of bead carrying mechanisms mounted on said annular frame to be disposed at both axial ends of said tire component carrying mechanism in spaced relation with each other, each of said bead carrying mechanims having a plurality of bead carrying members which is made radially movable to carry beads in concentrical relation with said tire building drum body, said bead carrying mechanism being movable toward and away from a position in which said carrying mechanisms respectively surround said bead applying mechanisms and being capable of setting beads on said tire component in cooperation with said bead applying mechanism while said annular frame surrounds said tire building drum.

2. A tire building apparatus as defined in claim 1, wherein said tire component carrying mechanism has a plurality of fluid operated cylinders securely mounted on the periphery of said annular frame in predetermined angular relation with each other and radially extending and each having a piston rod to the leading end of which said tire component carrying member is attached, and wherein said bead carrying mechanism has a plurality of fluid operated cylinders securely mounted on the periphery of said annular frame in predetermined angular relation with each other and radially extending and each having a piston rod to the leading end of which said bead carrying member is attached.

3. A tire building apparatus as defined in claim 1, wherein said tire component carrying members are arcuately formed to facilitate carrying said tire component and said bead carrying members are also arcuately formed to facilitate carrying said beads.

4. A tire building apparatus as defined in claim 3, wherein said bead is made of metal and each of said bead carrying members includes a base and a magnet secured to the axially outer ends of said base so that said magnets can attract said bead to carry the same in concentrical relation with said tire building drum.

* * * * *